United States Patent [19]

Yoshida et al.

[11] Patent Number: 5,570,210

[45] Date of Patent: Oct. 29, 1996

[54] LIQUID CRYSTAL DISPLAY DEVICE WITH DIRECTIONAL BACKLIGHT AND IMAGE PRODUCTION CAPABILITY IN THE LIGHT SCATTERING MODE

[75] Inventors: Hidefumi Yoshida; Kazutaka Hanaoka; Kimiaki Nakamura; Hideaki Tsuda; Fumiaki Yamada, all of Kawasaki, Japan

[73] Assignee: Fujitsu Limited, Kawasaki, Japan

[21] Appl. No.: 188,901

[22] Filed: Jan. 31, 1994

[30] Foreign Application Priority Data

May 6, 1993 [JP] Japan .................................. 5-105553

[51] Int. Cl.⁶ ........................ G02F 1/1333; G02F 1/1335
[52] U.S. Cl. ...................... 359/51; 359/49; 359/65
[58] Field of Search .................... 359/51, 52, 99, 359/49, 65

[56] References Cited

U.S. PATENT DOCUMENTS

| | | | |
|---|---|---|---|
| 4,732,456 | 3/1988 | Fergason | 359/51 |
| 5,093,735 | 3/1992 | Doane | 359/52 |
| 5,155,607 | 10/1992 | Inoue | 359/52 |
| 5,200,845 | 4/1993 | Crooker | 359/51 |
| 5,208,687 | 5/1993 | Yoshida et al. | 359/51 |
| 5,268,783 | 12/1993 | Yoshinaga | 359/51 |
| 5,325,218 | 6/1994 | Willett | 359/65 |
| 5,327,271 | 7/1994 | Takeuchi | 359/51 |
| 5,372,745 | 12/1994 | Yoshinaga | 359/51 |

FOREIGN PATENT DOCUMENTS

| | | | |
|---|---|---|---|
| 1102428 | 4/1989 | Japan | 359/65 |
| 1145635 | 6/1989 | Japan | 359/51 |
| 3-152523 | 6/1991 | Japan . | |
| 3188420 | 8/1991 | Japan | 359/65 |
| 4289821 | 10/1992 | Japan | 359/99 |
| 4-338923 | 11/1992 | Japan . | |
| 5107525 | 4/1993 | Japan | 359/99 |
| 5323296 | 12/1993 | Japan | 359/51 |
| 8504262 | 9/1985 | WIPO | 359/52 |
| 88/02128 | 3/1988 | WIPO . | |

OTHER PUBLICATIONS

Nishida et al., "Projection Type Liquid Crystal Brighter than CRT, Part 4; 100 Percent Utilization of Light Using Polarizer; 90 Degree Rotation by Polarized Light–Converting System," *Flat Panel Display '91*, Nov. 26, 1990, pp. 225–231.

*Primary Examiner*—Anita Pellman Gross
*Assistant Examiner*—Tiep H. Nguyen
*Attorney, Agent, or Firm*—Staas & Halsey

[57] ABSTRACT

A liquid crystal device including a liquid crystal layer comprising a liquid crystal of a dispersed type in which liquid crystal molecules are randomly distributed so that an incident light impinging against the liquid crystal molecules scatters to produce a white display spot. A polarizer and an analyzer are arranged on either side of the first and second transparent plates. A directional backlight is arranged on the outside of the polarizer for supplying light having a directivity in the direction perpendicular to the first and second transparent plates toward the polarizer.

12 Claims, 5 Drawing Sheets

LIQUID CRYSTAL DISPLAY DEVICE WITH DIRECTIONAL BACKLIGHT AND IMAGE PRODUCTION CAPABILITY IN THE LIGHT SCATTERING MODE

BACKGROUND OF THE INVENTION

1. Field of the Invention

The present invention relates to a liquid crystal display device including a dispersed-type liquid crystal layer in which liquid crystal molecules are randomly distributed so that an incident light, impinging on the liquid crystal molecules, scatters.

2. Description of the Related Art

Liquid crystal display devices are used in a variety of technical fields, for example, in office automation devices such as personal computers in which a display is directly viewed, or projection type display devices in which an image is projected onto a screen.

A liquid crystal display device, in which a display is directly viewed, generally comprises a liquid crystal panel including a liquid crystal material inserted between a pair of opposite transparent plates, a polarizer and an analyzer arranged on either side of the liquid crystal panel, and a backlight for supplying a light toward the polarizer. Light emitting from the backlight selectively passes through the polarizer, the liquid crystal panel, and the analyzer, so that an observer can see the light passing through the analyzer as a display image.

A conventional backlight includes a light source lamp, and a light scattering layer arranged between the lamp and the polarizer so that a scattered light passes through the liquid crystal panel. Therefore, the scattered light includes light components travelling in many directions and passing through the liquid crystal panel, so that an observer can see the image on the display surface from many directions, such as the direction normal to the display and the directions oblique to the normal of the display.

A projection type liquid crystal display device is disclosed, for example, in Japanese Unexamined Patent Publication No. 3-152523, which comprises a liquid crystal panel, a polarizer, an analyzer, and a light source. Light emitted from the light source is made incident to the liquid crystal panel via the polarizer, and light emitted from the liquid crystal panel and passing through the analyzer is projected onto a screen by a projection lens. In this publication, a polarized light inducing means such as a beam splitter is arranged between the light source and the polarizer. The projection type liquid crystal display device must necessarily include the light source for projecting an image to a screen, and the light source of the projection type liquid crystal display device fundamentally differs from a backlight of a direct viewing type liquid crystal display device. Also, a light scattering layer cannot exist between the light source and the screen in a projection type liquid crystal display device, because an image on the screen will be blurred if a light scattering layer exists between the light source and the screen.

Liquid crystal display devices often use a twisted nematic liquid crystal. Recently, the use of other liquid crystal, such as a polymer dispersed-type liquid crystal is proposed (for example, refer to WO-A-8802128).

In the twisted nematic liquid crystal, liquid crystal molecules are aligned in parallel to the transparent plates in a predetermined direction, and liquid crystal molecules rise (tilt) perpendicular to the transparent plates when the voltage is applied to the liquid crystal. In the polymer dispersed-type liquid crystal, liquid crystal capsules are dispersed in a polymer, and liquid crystal molecules in the capsules are randomly distributed so that an incident light impinging on the liquid crystal molecules scatters. Japanese Unexamined Patent Publication No. 4-338923 discloses a modified example of the polymer dispersed-type liquid crystal, in which a liquid crystal is used in place of the polymer. That is, liquid crystal capsules are dispersed in a liquid crystal, and liquid crystal molecules in the capsules are randomly distributed.

In the liquid crystal display devices using a twisted nematic liquid crystal and of the type in which a display is directly viewed, such as displays in personal computers, the display may be clearly viewed when viewed from a certain direction and the display may be not clearly viewed when viewed from another direction. This is caused from the fact that liquid crystal molecules in the twisted nematic liquid are aligned in a constant direction and generally recognized as a visual angular characteristics of the twisted nematic liquid crystal display devices.

On contrast, in the polymer dispersed-type liquid crystal display devices, liquid crystal molecules in the capsules are randomly distributed and the incident light impinging against the liquid crystal molecules scatters, i.e., refracts and reflects in all the directions, and accordingly a specific visual angular direction, which may deteriorate quality of the display in the twisted nematic liquid crystal display devices, does not exist in th polymer dispersed-type liquid crystal display devices. Accordingly, regarding the displays of the type in which the display is directly viewed, it is preferable to use polymer dispersed-type liquid crystal display devices having a light scattering property.

In the use of polymer dispersed-type liquid crystal display devices, a white display spot is produced by the scattering of the impinging incident light when the voltage is not applied and a black display spot is produced by causing the liquid crystal molecules to rise relative to the transparent plates when the voltage is applied. However, there is a problem that, upon producing a white display spot by the scattering of the light, a portion of the light which can be utilized for producing a white display spot is decreased because components of the scattering light travel in many directions. That is, only a portion of the scattering light within a certain angular range that travels toward the analyzer and emits from the display zone can be utilized, and a portion of the scattering light that travels toward the outside of the display zone and a portion of the scattering light that returns toward the polarizer are not utilized.

Also, the inventors have found that, in the case of the polymer dispersed-type liquid crystal display device used in combination with the conventional backlight, the backlight itself includes the light scattering layer, and the incident light is subjected to the scattering effect twice, i.e., at the light scattering layer of the backlight and at the light scattering liquid crystal layer, so that a portion of the light which can be utilized is decreased. Therefore, the polymer dispersed-type liquid crystal display devices do not suffer from the problem of viewing angle characteristics but the problem of a relatively dark white display spot.

SUMMARY OF THE INVENTION

The object of the present invention is to provide a liquid crystal display device in which a visual angular characteristics is not lowered and in which it is possible to improve a light utilization efficiency.

According to the present invention, there is provided a liquid crystal display device comprising a first transparent plate having transparent electrode means, a second transparent plate arranged oppositely to the first transparent plate with a small gap therebetween and having transparent electrode means, a liquid crystal layer having a light scattering property and inserted between the first and second transparent plates, a polarizer arranged on the outside of the first transparent plate, an analyzer arranged on the outside of the second transparent plate, and a directional backlight for supplying a light having a directivity in the direction perpendicular to the first and second transparent plates toward the polarizer.

With this arrangement, the light supplied by the backlight and having a directivity selectively passes through the polarizer, the liquid crystal panel, and the analyzer, respectively, and an observer can see the light as a display image. In this case, the backlight does not include a light scattering layer, but the liquid crystal layer has a light scattering property, so that the light having all directional components transmits the liquid crystal panel and so the observer can see the display not only from the direction normal to the display surface but also from the direction oblique to the normal to the display surface. Since the backlight does not include a light scattering layer, the amount of the transmitting light increases, as compared with the case where the backlight includes a light scattering layer.

In addition, in the dispersed-type liquid crystal display device, the greater the scattering property of the liquid crystal layer, the greater the range of viewing angle in which the display can be clearly seen, but the smaller the amount of the transmitting light. Reversely, the lower the scattering property of the liquid crystal layer, the smaller the range of viewing angle in which the display can be clearly seen, but the greater the amount of the transmitting light. The scattering property of the liquid crystal layer preferably satisfies these requirements.

In this case, it is preferable that the liquid crystal layer has a scattering value greater than 5, where the scattering value is defined by a reciprocal (L/T) of a ratio of an intensity of light (T) transmitting the liquid crystal layer that is measured by arranging the liquid crystal layer between a source of laser beam and a light detector arranged so as to receive a divergent light from the liquid crystal panel within the angular range of approximately 6 degrees, to an intensity of light (L) of the source of laser beam measured in the same arrangement of the source of laser beam and the light detector without any liquid crystal.

BRIEF DESCRIPTION OF THE DRAWINGS

The present invention will become more apparent from the following description of the preferred embodiments, with reference to the accompanying drawings, in which.

DESCRIPTION OF THE PREFERRED EMBODIMENTS

Figure 1:
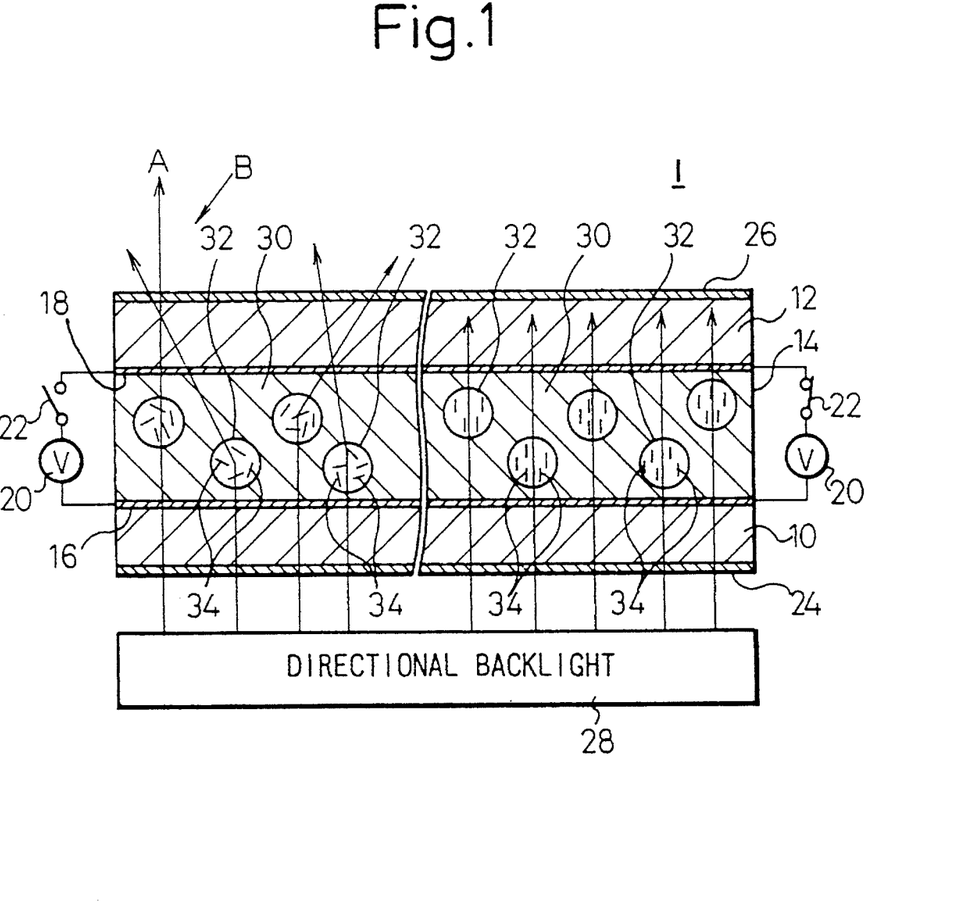
FIG. 1 is a cross-sectional view of a liquid crystal display device according to the first embodiment of the present invention.

FIG. 1 shows a liquid crystal display device 1 according to the first embodiment of the present invention. The liquid crystal display device 1 includes a liquid crystal panel comprising a first transparent plate 10, a second transparent plate 12 opposed to the first transparent plate 10 with a small gap therebetween, and a liquid crystal layer 14 inserted between the first and second transparent plates 10 and 12. The first transparent plate 10 has on the interior surface thereof a transparent electrode 16 and the second transparent plate 12 has on the interior surface thereof a transparent electrode 18. Each of the transparent electrodes 16 and 18 comprises a layer of ITO ($In_2O_3$-$SnO_2$) and is connected to a power source 20 via a switch 22. The left half part of FIG. 1 shows a condition in which the voltage is not applied to the liquid crystal layer 14, and the right half part of FIG. 1 shows a condition in which the voltage is applied to the liquid crystal layer 14. Although the transparent electrodes 16 and 18 and the switch 22 are shown in a simplified manner, it will be apparent that one of the transparent electrodes 16 is a common electrode and the other electrode 18 comprises a plurality of picture electrodes provided at respective small picture regions. It is also known that the electrode 18 is driven by an active matrix drive.

A polarizer 24 and an analyzer 26 are arranged on the outside (i.e., the exposed, external main surface) of the first and second transparent plates 10 and 12, respectively. The polarizer 24 and the analyzer 26 are arranged to have transmitting axes of polarized light in a perpendicular relationship to each other.

In addition, a directional backlight 28 is arranged on the outside of the polarizer 24 for supplying light, having a directivity in the direction perpendicular to the first and second transparent plates 10 and 12, toward the polarizer 24.

The liquid crystal layer 14 comprises a polymer dispersed-type liquid crystal. That is, the liquid crystal layer 14 comprises liquid crystal capsules 32 dispersed in a polymer layer 30. Liquid crystal molecules 34 are randomly distributed in the liquid crystal capsules 32. The liquid crystal layer 14 can be obtained by mixing positive nematic liquid crystal materials in which a birefringence and a dielectric constant thereof are positive, and liquid polymer material to form the polymer layer 30 and by curing the polymer material by an ultraviolet irradiation. Upon ultraviolet curing, the liquid crystal material gathers to become liquid crystal capsules 32 which are dispersed in the polymer layer 30. Alternatively, it is possible to obtain the liquid crystal capsules 32 by mixing a liquid crystal material in a polymer material containing a volatile component, and by evaporating the volatile component to harden the polymer material.

The liquid crystal molecules 34 are randomly distributed in the liquid crystal capsules 32. Therefore, the light supplied from the backlight 28 and transmitted through the polarizer 24 impinges against the liquid crystal molecules 34 and scatters, when the voltage is not applied, as shown in the left half part of the device 1 in FIG. 1. The scattered light comprises components having all directions, as derived from the refraction and the reflection, and a portion of the scattered light passes through the analyzer 26, as shown by the arrows. It is thus possible to produce a white display spot of the scattered light passing through the analyzer 26.

An observer directly sees the display screen (not shown) formed above the analyzer 26. It is possible to see the display screen not only from the direction normal to the display screen but also from directions oblique to the normal to the display screen, since the scattered light comprises components having all directions, as shown by the arrows. If the light emitted from the analyzer 26 has no scattering property and the light instead has only the direction A, for example, as transmitted through the analyzer 26, an observer who sees the display screen in the direction of the arrow B, for example, cannot see this white display spot.

As shown in the right half part of device 1 in FIG. 1, when the voltage is applied, the liquid crystal molecules 34 uniformly rise (i.e., tilt, or rotate) relative to the first and second transparent plates 10 and 12; as a result, the light supplied from the backlight 28 and passing through the polarizer 24 passes through the liquid crystal molecules 34 without changing condition, or direction. Since the transmitting axes of polarized light of the polarizer 24 and the analyzer 26 are arranged perpendicular to each other, the light transmitted through the polarizer 24 is blocked by the analyzer 26. Accordingly, a black display spot is produced in this case.

Figure 2:
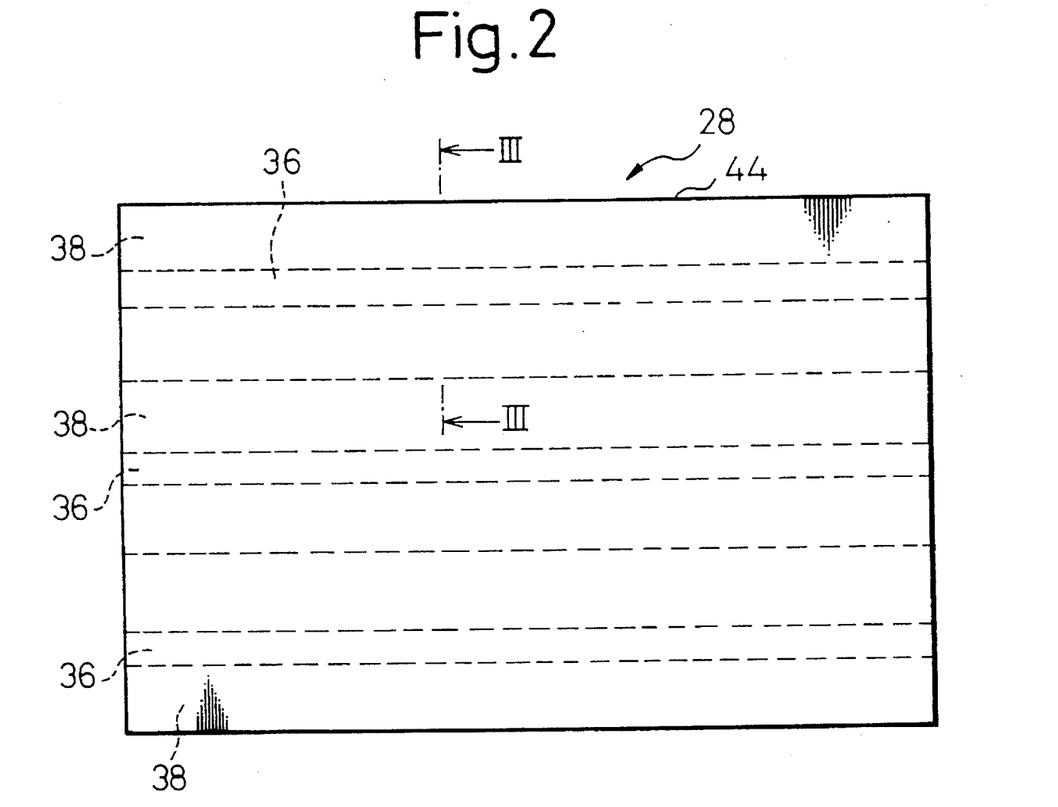
FIG. 2 is a plan view of the liquid crystal display device of FIG. 1.
Figure 3:
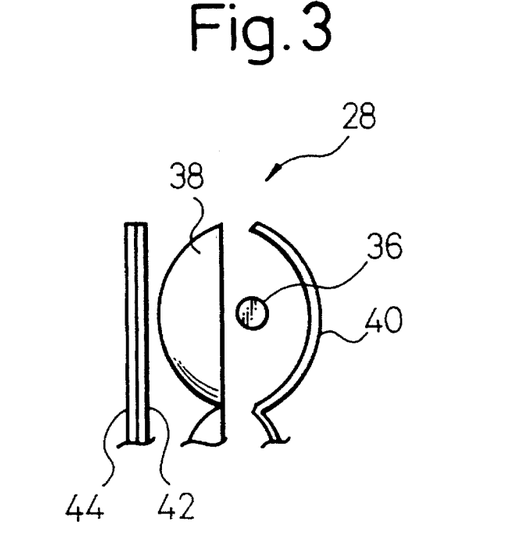
FIG. 3 is a cross-sectional view of the liquid crystal display device of FIGS. 1 and 2, taken along the line III—III in FIG. 2.

FIGS. 2 and 3 show the arrangement of the directional backlight 28. The backlight 28 comprises a plurality (three in the example) of parallel light source lamps 36, lenses 38 arranged for every lamp 36 for bending the divergent light beams into parallel light beams to be supplied to the polarizer 24, and reflectors 40 arranged on the side of each lamp 36 remote from associated lens 38. The lamps are of an elongated tubular form, and the lenses 38 and the reflectors 40 are also of an elongated form, similar to the lamps 36. In the embodiment, three lenses 38 are arranged so as to form a plane, whereby the backlight 28 is as thin as possible irrespective of the provision of the lenses 38. Each lens 38 is designed such that a majority of light beams emitting by the backlight 28 toward the polarizer 24 has a directivity in the range of within an angle of 10 degrees relative to the normal to the first and second transparent plates 10 and 12.

The backlight 28 also includes means for inducing a polarized light. Means for inducing a polarized light comprises a cholesteric liquid crystal filter 42 and a ¼ λ plate (wave plate) 44. Means for inducing a polarized light comprising the cholesteric liquid crystal filter 42 and the ¼ λ plate 44 is described in page 227 of the publication "Flat Panel Display 91". The cholesteric liquid crystal filter 42 and the ¼ λ plate 44 are arranged over the three rows of the lenses 38.

Figure 4:
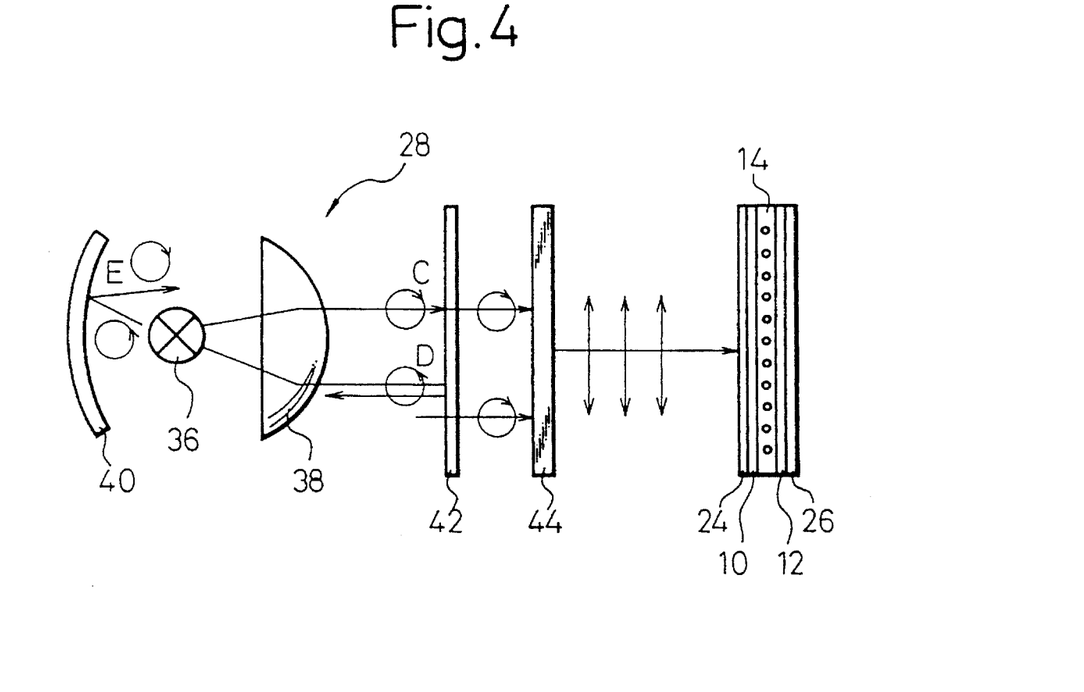
FIG. 4 is a view illustrating the operation of the backlight of FIGS. 2 and 3.

FIG. 4 is a view illustrating the operation of the backlight 28 of FIGS. 2 and 3. The light source lamps 36 emit divergent light beams, and a portion of the divergent light beams is bent into parallel light beams at the lenses 38, and another portion of the divergent light beams travels toward the reflectors 40. The directional light is thus supplied to the polarizer 24. It is possible to consider that the light emitted from lamps 36 can be dissolved into linearly polarized lights, and linearly polarized lights can be added into a right circular polarized light and a left circular polarized light.

The cholesteric liquid crystal filter 42 has such a property that the right circular polarized light, shown by the arrow C, passes through the cholesteric liquid crystal filter 42 and the left circular polarized light, shown by the arrow D, is reflected at the cholesteric liquid crystal filter 42. The left circular polarized light reflected at the cholesteric liquid crystal filter 42 travels toward the reflector 40 and is reflected thereat. The left circular polarized light is converted to the right circular polarized light when reflected at the reflector 40. This right circular polarized light again travels toward the cholesteric liquid crystal filter 42. In this way, a majority of the light emitting from the lamps 36 is converted into the right circular polarized light and is transmitted to the cholesteric liquid crystal filter 42. The ¼ λ plate 44 has such a property that the circular polarized light is converted into a linearly polarized light and, accordingly, directional linearly polarized light is supplied to the polarizer 24. The optical axis of the ¼ λ plate 44 is arranged to let the polarized direction be parallel to the transmitting axis of the polarizer 24, and it is possible that a majority of the light emitted by the lamps 36 can transmit through the polarizer 24.

In addition, in the polymer-dispersed-type liquid crystal display device of FIG. 1, the greater the scattering property of the liquid crystal layer 14, the greater the range of viewing angle in which the display can be clearly seen, but the smaller the amount of the transmitting light. Reversely, the lower the scattering property of the liquid crystal layer 14, the smaller the range of viewing angle in which the display can be clearly seen, but the greater the amount of the transmitting light. The scattering property of the liquid crystal layer 14 preferably satisfies these requirements.

In this case, it is convenient that the scattering property of the liquid crystal layer 14 is quantified by an appropriate scattering value. In the present invention, a scattering value is defined as follows.

Figure 5:
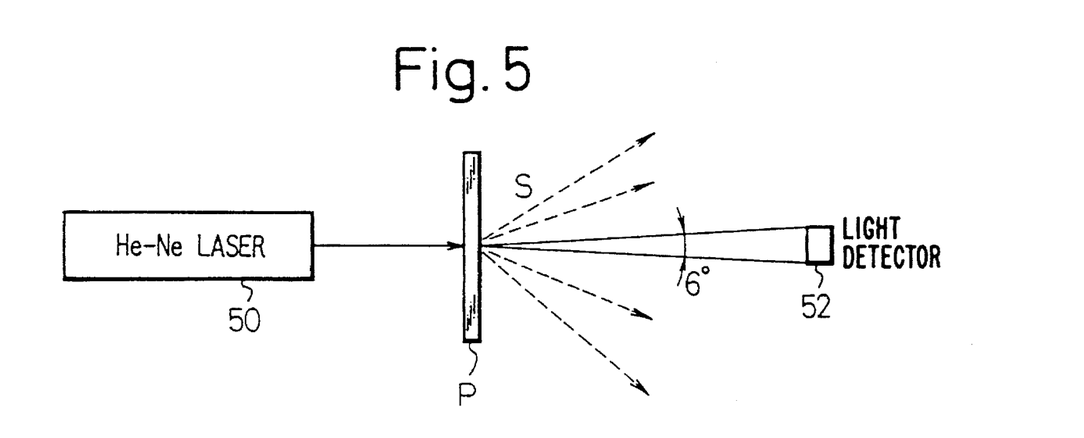
FIG. 5 is a view of a measuring device for measuring a scattering value of the liquid crystal layer.

FIG. 5 shows a measuring device for measuring a scattering property of the liquid crystal layer 14. The measuring device comprises a source of laser beam 50 and a light detector 52. He—Ne laser is used as the source of laser beam 50. It is possible to use a photomultiplier or a photodiode having an opening with a predetermined size as the light detector 52.

In FIG. 5, the liquid crystal panel P having the polymer dispersed-type liquid crystal layer 14 is arranged between the source of laser beam 50 and the light detector 52 in a predetermined relationship. The liquid crystal panel P does not include the polarizer 24 and the analyzer 26. When the laser beam is irradiated by the source of laser beam 50 onto the liquid crystal panel P, the laser beam transmitting through the liquid crystal panel P impinges against the liquid crystal molecules 34 in the liquid crystal capsules 32 and scatters, and thus the scattered light S is emitted from the liquid crystal panel P. The scattered light S diverges in various directions depending on the extent of the scattering.

The light detector 52 is disposed in such an arrangement that the light detector 52 receives the divergent light S from the liquid crystal panel P within the angular range of approximately six degrees. To achieve the angular range of approximately six degrees, for example, the distance between the liquid crystal panel P and the light detector 52 is selected to be 572 millimeters when the inlet opening of the light detector 52 is 6 millimeters. When another light detector 42 having a different inlet opening is used, it is possible to change the distance between the liquid crystal panel P and the light detector 52 such that the light detector 52 receives the divergent light S from the liquid crystal panel P within the angular range of approximately six degrees.

In this way, the intensity of the light T passing through the liquid crystal panel P is measured. Then the liquid crystal panel P is removed from the measuring device, and an intensity of light L of the source of laser beam 50 is measured by the measuring device, comprising the source of laser beam 50 and the light detector 52 maintained in the same arrangement.

The scattering value is defined by a reciprocal (L/T) of a ratio of the intensity of light T transmitting the liquid crystal panel P to the intensity of light L of the source of laser beam 50. The smaller the scattering value defined in this way, the closer the intensity of light T transmitting the liquid crystal layer 14 to the intensity of light L of the source of laser beam 50, and the smaller the extent of the scattering of the light due to the liquid crystal molecules 34. Stated in reverse, the greater the scattering value defined in this way, the smaller the intensity of light T transmitting through the liquid crystal layer 14 than the intensity of light L of the source of laser beam 50, and the greater the extent of the scattering of the light due to the liquid crystal molecules 34. That is, the greater the extent of the scattering of the light, the smaller the amount of the light that is received by the light detector 52 within the angular range of approximately six degrees.

To determine the optimum scattering value, several kinds of samples of the liquid crystal panels P having various scattering values are prepared. The various scattering values are changed by changing the thickness of the liquid crystal layer 14, the content of the liquid crystal 18 in the polymer layer 30, and the size of the liquid crystal capsules 32. The scattering values are measured for these samples of the liquid crystal panel P, in accordance with the above described manner. Then, the polarizer 24, the analyzer 26, and the backlight 28 are attached to each sample of the liquid crystal panels P to make the polymer dispersed-type liquid crystal display device of FIG. 1, respectively.

Figure 6:
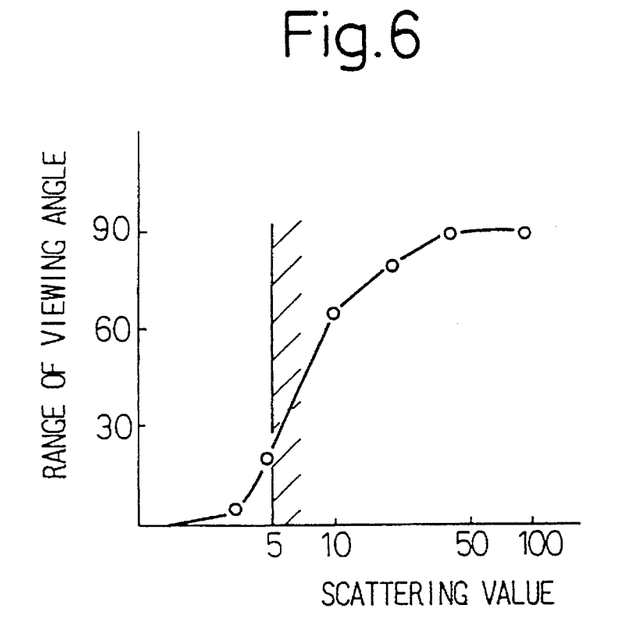
FIG. 6 is a view illustrating the range of good viewing angle in which a predetermined contrast is obtained.

FIG. 6 shows an experimental result of the range of good viewing angles in which a predetermined contrast is obtained, using these polymer dispersed-type liquid crystal display devices. From the experimental result shown in FIG. 6, it has been found that a display with a good contrast over the viewing angle of approximately 30 degrees can be obtained when the scattering value of the liquid crystal layer 14 is greater than 5. That is, it is preferable that the scattering value of the liquid crystal layer 14 be greater than 5 in the case where the light scattering liquid crystal layer 14 is used in combination with the backlight 28 without a light scattering layer.

The present invention can be applied not only to the polymer dispersed-type liquid crystal display device of FIG. 1 but to other types of the liquid crystal display devices that have a light scattering property. Examples of such liquid crystal display devices are shown in FIGS. 7 to 9.

Figure 7:
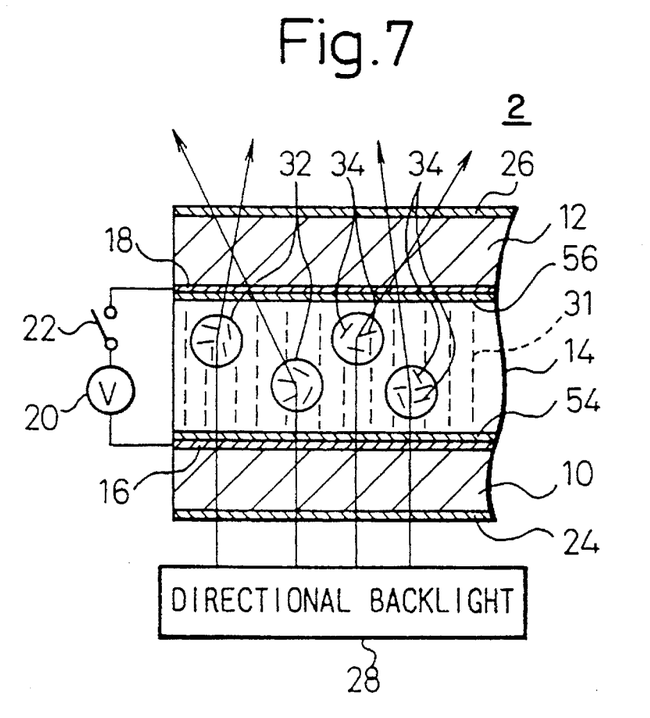
FIG. 7 is a cross-sectional view of a liquid crystal display device according to the second embodiment of the present invention.

FIG. 7 shows a liquid crystal display device 2 according to a second embodiment of the present invention. Similar to the first embodiment, the liquid crystal display device 2 comprises a liquid crystal panel comprising a liquid crystal layer 14 inserted between first and second transparent plates 10 and 12, transparent electrodes 16 and 18, a polarizer 24, an analyzer 26, and a directional backlight 28.

The liquid crystal layer 14 includes liquid crystal capsules 32 dispersed in a liquid crystal layer 31. The liquid crystal capsules 32 include liquid crystal molecules 34 encapsulated in the capsules made of, for example, polymethyl methacrylate (PMMA) resin. The liquid crystal molecules 34 are randomly distributed in the liquid crystal capsules 32. In addition, orientation layers 54 and 56 are arranged on the transparent electrodes 16 and 18, respectively. The orientation layers 54 and 56 are vertical orientation layers by which the liquid crystal molecules 34 are aligned in a direction perpendicular to the first and second transparent plates 10 and 12. The liquid crystal display device of FIG. 7 only differs from that of FIG. 1 in that the liquid crystal layer 31 is used in place of the polymer layer 30 in FIG. 1, and the operation of the liquid crystal display device of FIG. 7 is based on the behavior of the liquid crystal molecules 34 randomly distributed in the liquid crystal capsules 32 and is fundamentally similar to that of FIG. 1.

Figure 8:
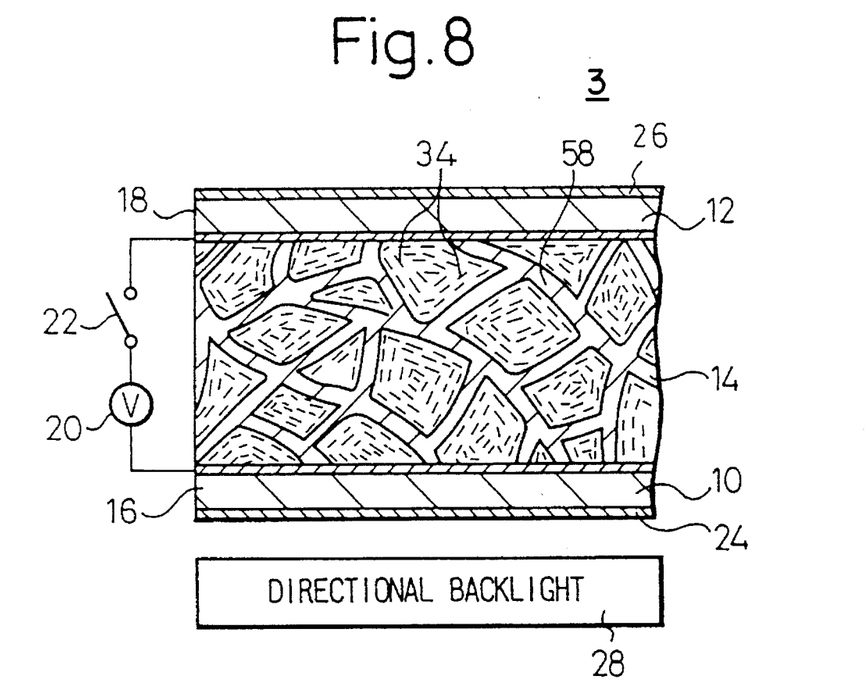
FIG. 8 is a cross-sectional view of a liquid crystal display device according to the third embodiment of the present invention.
Figure 9:
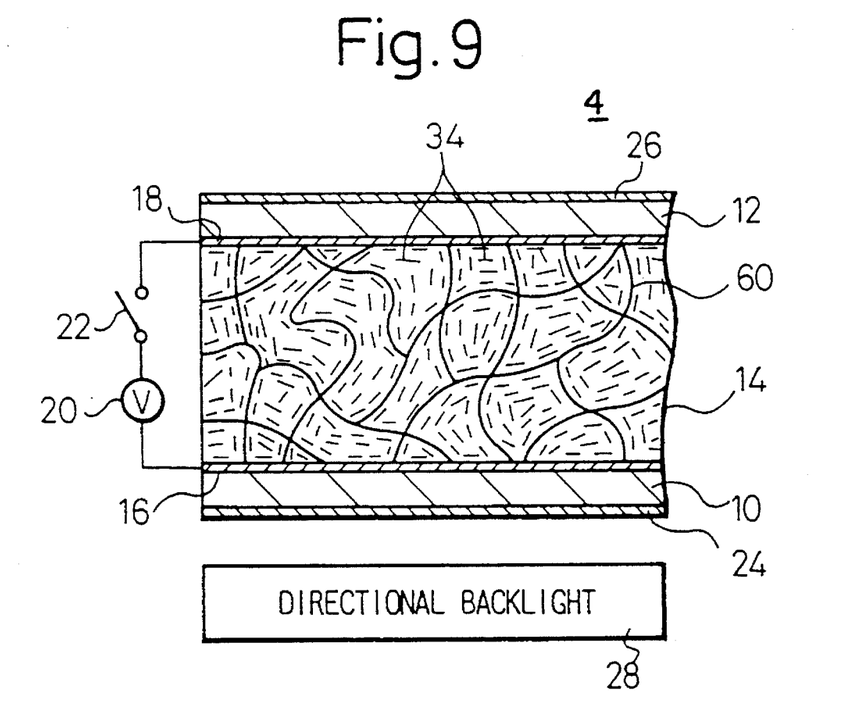
FIG. 9 is a cross-sectional view of a liquid crystal display device according to the fourth embodiment of the present invention.

FIG. 8 shows a liquid crystal display device 3 of the type called a polymer network liquid crystal display device. The liquid crystal display device includes a liquid crystal panel comprising a liquid crystal layer 14 inserted between first and second transparent plates 10 and 12. The first and second transparent plates 10 and 12 have transparent electrodes 16 and 18 of ITO. A polarizer 24 and an analyzer 26 are arranged on either side of the liquid crystal panel, and a directional backlight 28 is arranged on the outside of the polarizer 24.

The liquid crystal layer 14 includes liquid crystal molecules 34 dispersed in a polymer layer 58 with a sponge-like network structure. The liquid crystal molecules 34 are randomly distributed in spaces in the polymer layer 58. Therefore, when the voltage is not applied to the liquid crystal layer 14, an incident light impinges against the liquid crystal molecules 34 and scatters to produce a white display spot, and when the voltage is applied to the liquid crystal layer 14, the liquid crystal molecules 34 uniformly rise, relative to the first and second transparent plates 10 and 12, to produce a black display spot. These liquid crystal panels also satisfy the above described scattering value.

FIG. 9 shows the liquid crystal display device 4 of a type using a macromolecular liquid crystal (liquid crystal polymer). The liquid crystal display device 4 includes a liquid crystal panel comprising a liquid crystal layer 14 inserted between first and second transparent plates 10 and 12. The first and second transparent plates 10 and 12 have transparent electrodes 16 and 18 of ITO, respectively. A polarizer 24 and an analyzer 26 are arranged on either side of the liquid crystal panel, and a directional backlight 28 is arranged on the outside of the polarizer 24.

The liquid crystal layer 14 comprises mixture of a low-molecular liquid crystal molecules 34 and a macromolecular liquid crystal molecules 60 known as a principal chain-type liquid crystal polymer or a side chain-type liquid crystal polymer. The low-molecular liquid crystal molecules 34 align along the macromolecular liquid crystal molecules 60 and are randomly distributed as a whole. Therefore, when the voltage is not applied to the liquid crystal layer 14, incident light impinges against the liquid crystal molecules 34 and scatters, and when the voltage is applied to the liquid crystal layer 14, the liquid crystal molecules 34 uniformly rise relative to the first and second transparent plates 10 and 12. This liquid crystal panel also satisfies the above described scattering value.

As described above, according to the present invention, it is possible to obtain a liquid crystal display device in which the range of good viewing angle is wide and the brightness in the white display condition is high.

We claim:

1. A direct viewing type liquid crystal display device, comprising:

a first transparent plate having inside and outside parallel main surfaces and a first transparent electrode formed on the inside main surface thereof;

a second transparent plate having inside and outside parallel main surfaces and a second transparent electrode formed on the inside main surface thereof, the second transparent plate being positioned in spaced, parallel relationship to the first transparent plate with a gap between the respective inside main surfaces thereof;

a liquid crystal layer having, selectively, a light scattering mode and a light transmitting mode and being disposed in the gap between the first and second transparent plates;

a polarizer arranged on the outside main surface of the first transparent plate;

an analyzer arranged on the outside main surface of the second transparent plate; and a directional backlight unit supplying a backlight to the direct viewing type liquid crystal display device, the backlight having a directivity substantially in a normal direction relatively to the respective main surfaces of the first and second transparent plates and a large proportion of the backlight, supplied from the backlight unit to the polarizer, having a directivity within an angular range of up to an angle of 10 degrees relative to the normal direction, the backlight being transmitted through the liquid crystal device in the light scattering mode of the liquid crystal layer for image production and being blocked by the analyzer after transmission through the liquid crystal layer in the light transmitting mode of the liquid crystal layer.

2. A direct viewing type liquid crystal display device according to claim 1, wherein the backlight unit comprises:

a lamp which emits divergent light beams; and a lens which converts the divergent light beams emitted by the lamp into generally parallel light beams extending substantially in the normal direction and within the angular range relative thereto, as supplied to the polarizer.

3. A direct viewing type liquid crystal display device according to claim 2, wherein the backlight unit further comprises means for inducing polarized light.

4. A direct viewing type liquid crystal display device according to claim 1, wherein the backlight unit further comprises:

a lamp which emits divergent light beams;

a lens which bends the divergent light beams emitted by the lamp into generally parallel light beams;

a reflector arranged on a side of the lamp remote from the lens; and means, arranged between the lens and the polarizer, for receiving the generally parallel light beams and emitting the received light beams as polarized light beams.

5. A direct viewing type liquid crystal display device according to claim 1, wherein the liquid crystal layer includes randomly distributed liquid crystal molecules, incident light from the backlight unit impinging on the liquid crystal molecules being scattered thereby.

6. A direct viewing type liquid crystal display device according to claim 5, wherein the liquid crystal layer comprises a dispersed-type liquid crystal material in which liquid crystal molecules are randomly distributed so that incident light, impinging on the liquid crystal molecules, is scattered thereby in the absence of a voltage being applied to the liquid crystal layer and the liquid crystal molecules uniformly rise relative to the first and second transparent plates, when a voltage is applied to the liquid crystal, so that the incident light from the directional backlight unit and having a directivity substantially in the normal direction passes through the liquid crystal layer without being scattered by the liquid crystal molecules.

7. A direct viewing type liquid crystal display device according to claim 6, wherein the liquid crystal layer comprises liquid crystal capsules dispersed in a transparent material.

8. A direct viewing type liquid crystal display device according to claim 5, wherein the liquid crystal layer comprises:

a first liquid crystal material in the gap between the first and second transparent plates; and liquid crystal capsules dispersed in the first liquid crystal material, each capsule including therein a second liquid crystal material.

9. A direct viewing type liquid crystal display device according to claim 5, wherein the liquid crystal layer comprises a polymer network type liquid crystal material.

10. A direct viewing type liquid crystal display device according to claim 5, wherein the liquid crystal layer comprises a macromolecular liquid crystal material.

11. A direct viewing type liquid crystal display device according to claim 1, wherein the liquid crystal layer has a scattering value greater than 5, the scattering value being defined by a reciprocal (L/T) of a ratio of an intensity of light (T) transmitting through the liquid crystal layer, measured by arranging the liquid crystal layer between a source of the laser beam and a light detector arranged so as to receive divergent light beams from the liquid crystal panel within the angular range of approximately 6 degrees, to an intensity of light (L) of the source of the laser beam, measured in the same arrangement of the source of the laser beam and the light detector but without any liquid crystal therebetween.

12. A direct viewing type liquid crystal display device according to claim 1, wherein the polarizer and the analyzer have respective transmitting axes which are perpendicular to each other, the backlight being transmitted through the liquid crystal display device in the light scattering mode of the liquid crystal layer and being blocked from transmission through the liquid crystal display device in the light non-scattering mode of the liquid crystal layer.

* * * * *

UNITED STATES PATENT AND TRADEMARK OFFICE
CERTIFICATE OF CORRECTION

PATENT NO. : 5,570,210
DATED : Oct. 29, 1996
INVENTOR(S) : YOSHIDA et al.

It is certified that error appears in the above-indentified patent and that said Letters Patent is hereby corrected as shown below:

Col. 5, line 38, change "from associated" to --from the associated--.

Col. 7, line 53, delete "the".

Col. 8, line 15, after "device" insert --3--.

Signed and Sealed this

Twenty-fifth Day of March, 1997

Attest:

BRUCE LEHMAN

Attesting Officer

Commissioner of Patents and Trademarks